March 20, 1973  F. D. C. BATE  3,721,801
AUTOMATIC SEALER CONTROL
Filed Aug. 26, 1969  4 Sheets-Sheet 1
-FIG.1.-
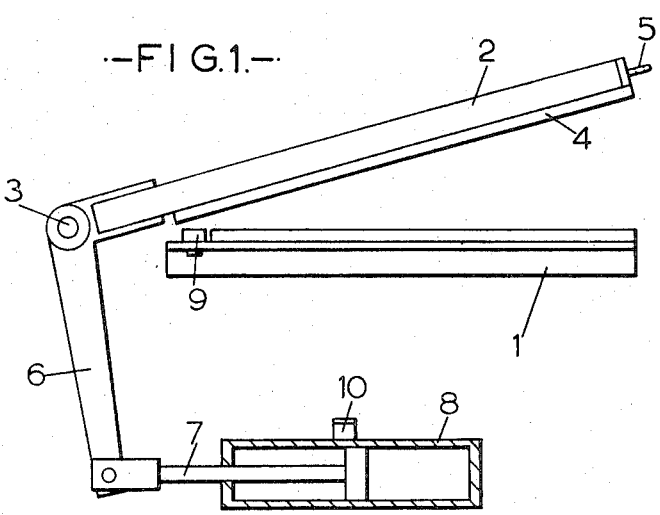
-FIG.2.-
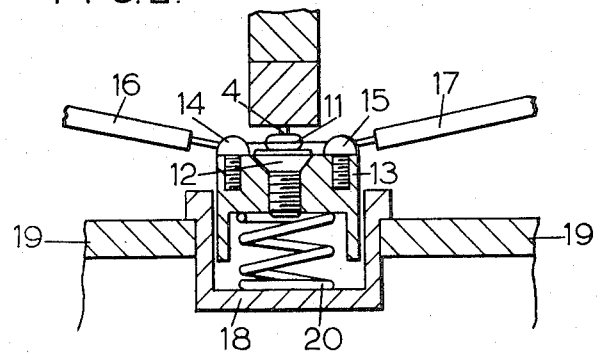

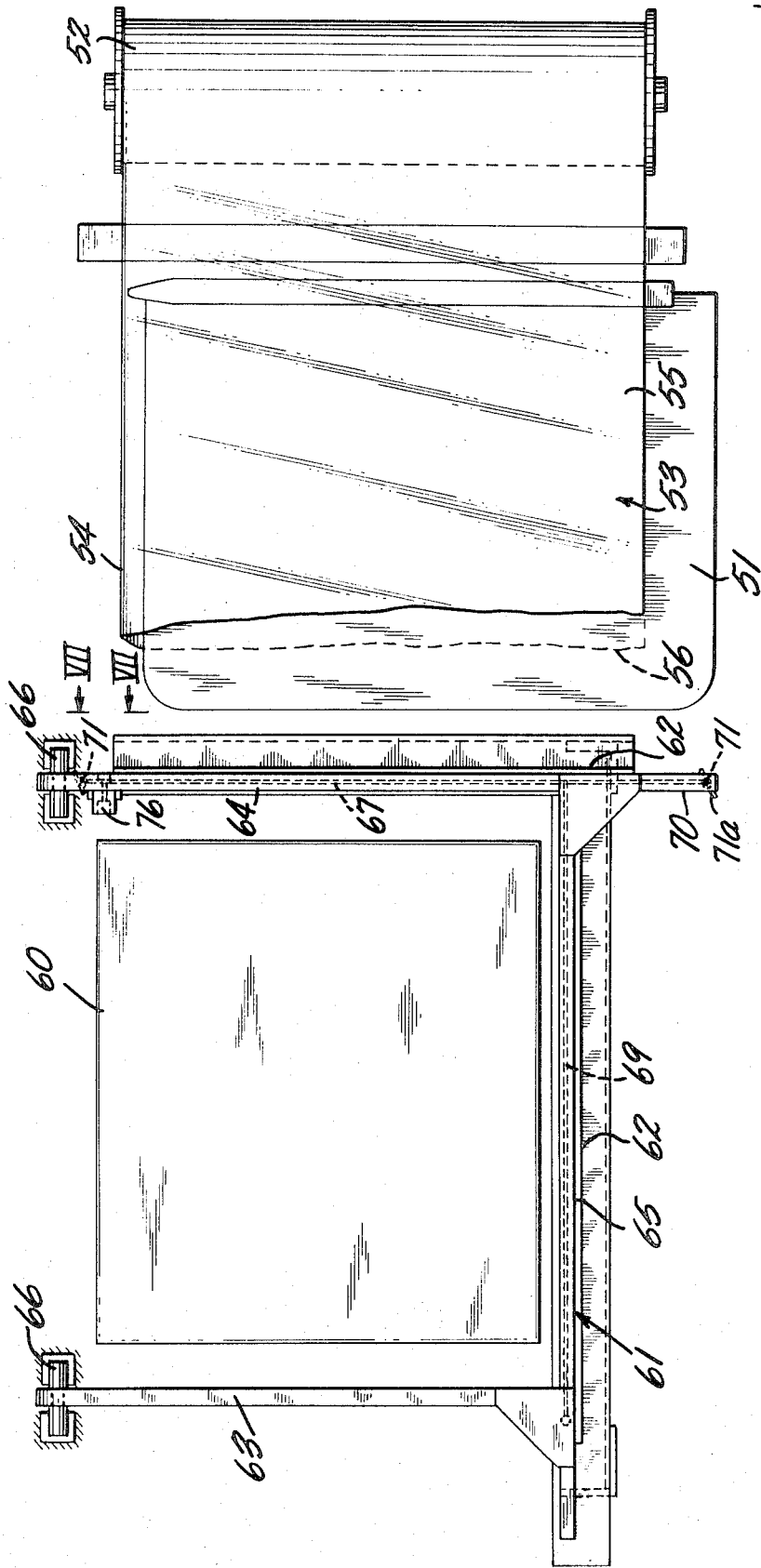

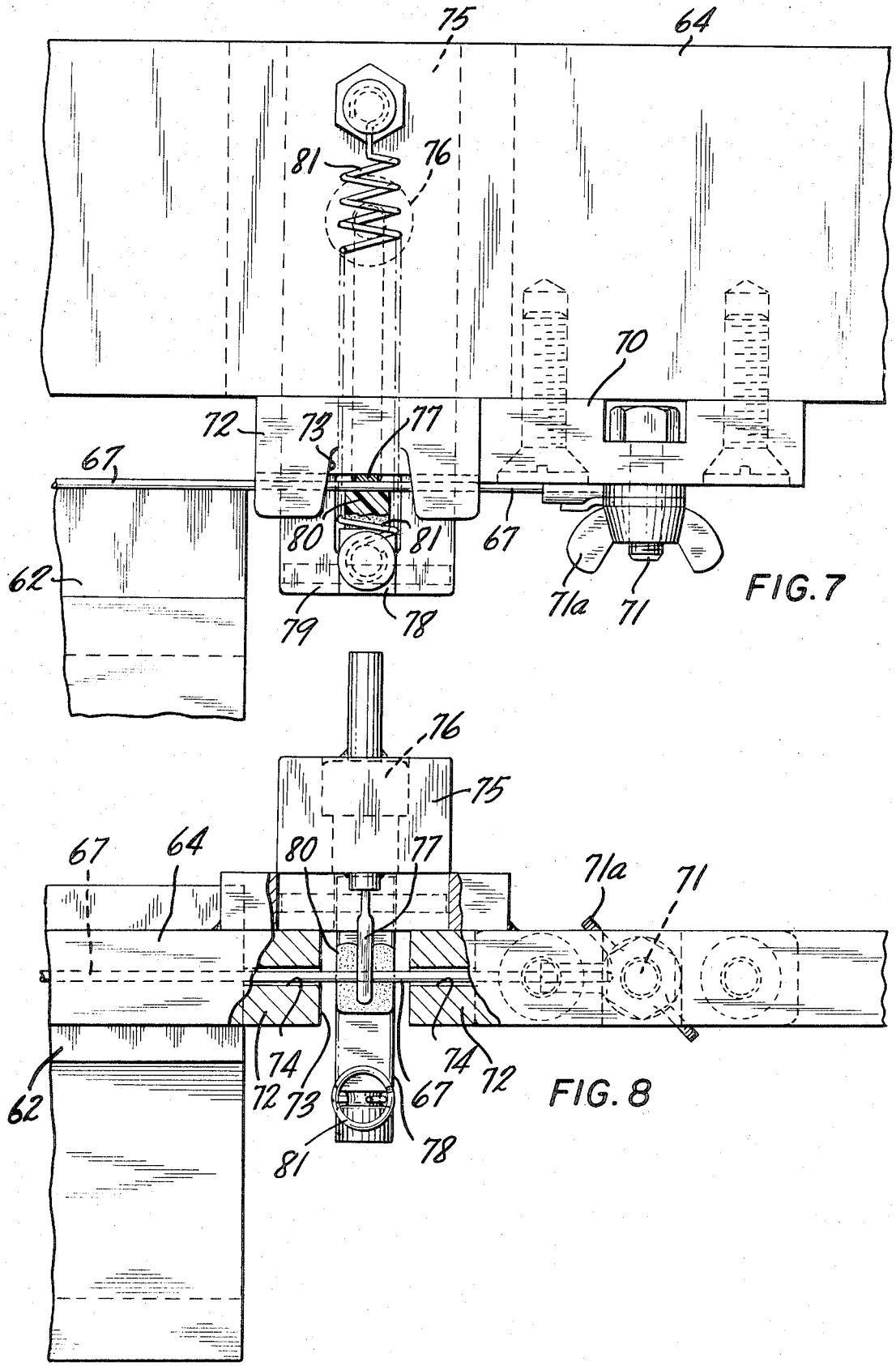

United States Patent Office 3,721,801
Patented Mar. 20, 1973

3,721,801
AUTOMATIC SEALER CONTROL
Frederick Douglas Clavell Bate, 155 Barkerhouse Road, Nelson, England
Continuation-in-part of application Ser. No. 611,420, Jan. 24, 1967. This application Aug. 26, 1969, Ser. No. 871,425
Claims priority, application Great Britain, Jan. 22, 1966, 3,012/66
Int. Cl. H05b 1/00
U.S. Cl. 219—243     14 Claims

ABSTRACT OF THE DISCLOSURE

Strip or sheet of plastic film is folded and the plies sealed together to form envelopes by a sealing head having an intermittently heated exposed sealing element. The duration of application of the sealing element to the film is automatically controlled according to the temperature of the sealing element, the sealing head being power operated to remove the sealing element from the film when the sealing element reaches a predetermined temperature.

This application is a continuation-in-part of my copending application Ser. No. 611,420, filed Jan. 24, 1967 and now abandoned.

In packaging machinery which is intended to use plastic film material for wrapping the goods, it is usual to employ some kind of heat sealing apparatus. In general the sealing apparatus comprises a wire, tape or the like which is heated by the passage of electric current through it. The electric resistance heating element is convenient but there may be instances where some other form of heating element (e.g. a tube through which steam or hot water can be passed) are employed.

Now for effective sealing it is important that the temperature of the element should be closely controlled, and that the duration of application of the element to the sheet should also be carefully controlled. Even with fully automatic machines, these desiderata are difficult to achieve, because the temperature of the element is subject to external influences, and in particular to the ambient temperature of the sealing head (i.e. the mechanical parts which carry the element). In the case of semi-automatic machines wherein the speed of operation of the machine is at least partially dependent upon the operative, the maintenance of controlled temperature and correct duration of application is even more difficult, because if the machine is operated slowly, its head will remain comparatively cool, whereas if it is operated rapidly, its head will become heated.

It is the object of the present invention to mitigate the effect of external factors on the correct operation of a heated sealing element for plastics film material.

According to this invention the duration of application of a heat sealing apparatus to plastics film is limited by means automatically responsive to the attainment of a predetermined temperature by the sealing element of the apparatus.

Preferably, apparatus for carrying out the method of the invention comprises a heat sealer including a heated element, means for withdrawing the sealer from its operative position, and temperature sensing means adapted to sense the temperature of the sealer and to cause operation of the withdrawal means on the attainment of the predetermined temperature by the sealer.

The temperature sensing means may operate directly on the heating element, or on part of the sealer adjacent to the element. The temperature sensing means may be adapted to operate indirectly through some electrical, physical or other measurable change in the element or the sealer due to the temperature rise.

Figure 3:
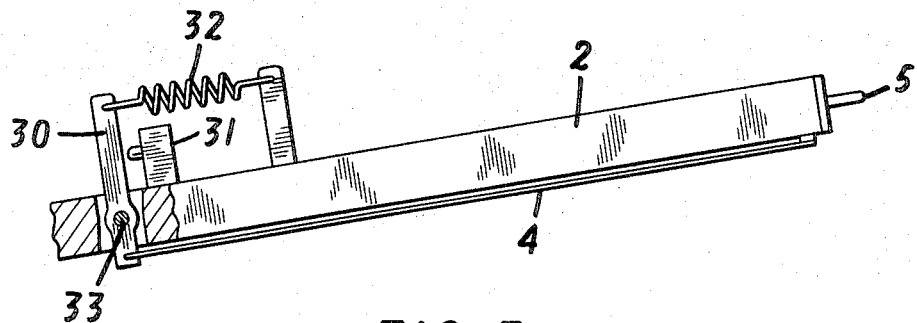
Figure 4:
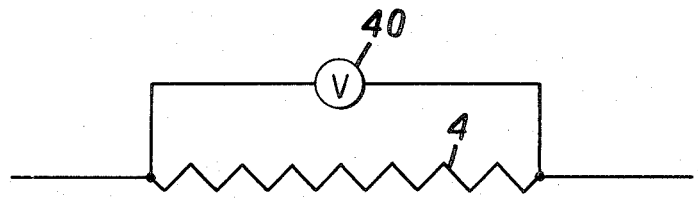
Figure 5:
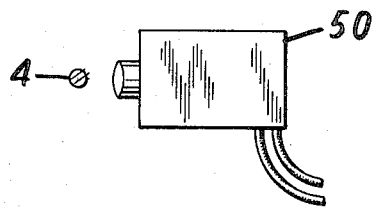

Preferred methods of carrying out the invention will now be described, by way of example only, with reference to the accompanying drawings, in which:

FIG. 1 is a diagrammatic side view of a wrapping machine, in a partly opened position, FIG. 2 is a section on an enlarged scale of a temperature sensing device, FIG. 3 is a view of an alternative temperature sensing device on a sealer, FIG. 4 is a diagram of a further temperature sensing device, FIG. 5 is a diagram showing a still further temperature sensing device, FIG. 6 is a plan view of another embodiment of apparatus in accordance with the invention showing a pack forming station and a sealing station, FIG. 7 is an enlarged partial elevation looking in the direction of the arrow VII in FIG. 6, and FIG. 8 is a partial plan view on an enlarged scale showing details.

In these particular arrangements, the invention is applied to a semi-automatic shrink wrapping machine which employs plastic film (e.g. polyvinylchloride or polyethylene) as the wrapping. Shrink wrapping is now a well understood process, but for the sake of completeness the general features of the machine will be described. Basically it comprises a pack forming station (not shown), a sealing station illustrated in FIG. 1, and an oven (not shown).

The pack forming station comprises a frame which supports a pack plate and a film roll. The film is drawn off the roll in a folded condition, the fold being along its rear edge, so that there are two layers of film. One layer passes over and the other under the pack plate, and the leading edges are sealed together by a previous sealing and severing operation. The goods to be wrapped are placed on the plate and pushed into engagement with the rear fold and the leading sealed edge of the film.

From the pack forming station, the pack with its film is moved by hand on to a sealing table 1 (FIG. 1) at the sealing station. A rectangular sealing frame 2 is pivoted at its rear end about a horizontal axis 3, and this frame carries electric resistance wire sealing elements 4 (FIG. 2) along the front and trailing edges. When the pack is positioned, by the operator below this frame, the latter is lowered by hand to a position where its two elements engage with the film of the pack. This seals the front edges of the film together, and seals and severs the trailing edges (thereby completely enclosing the pack) and at the same time forms a seal across the leading edges of the stock of film ready for the next pack. The wrapped pack then passes through the oven where the film is shrunk on to the pack.

The sealing frame 2 is provided with a handle 5 so that it can be lowered by hand, and the arrangement is such that the electric current is applied to the elements as soon as the frame arrives at its lowered (operative) position.

At one end of the machine, a cranked lever 6 is connected to the frame 2 and the other sand of this lever is connected to the ram 7 of a hydraulic or pneumatic cylinder 8. In the operative position of the frame, the ram is extended, but if the cylinder is operated—by actuation of a solenoid controlled valve 10—the ram is retracted and the frame is raised to its inoperative position. The operator therefore only initiates the sealing cycle of the machine by lowering the frame and the duration of the application of the sealing head to the film is determined by the time taken between the frame being lowered and the valve being operated to lift the frame.

Since the correct duration of application of the sealing head is determined by the temperature achieved by the heating element, the temperature sensing means essential to the invention preferably operates directly on the resistance wire 4. In this particular arrangement, it takes the form of a pyrometer 9 acting directly on one of the wires, and arranged to switch in the solenoid of the valve 10 at the predetermined temperature.

Referring now to FIG. 2, the pyrometer 9 takes the form of a thermistor 11 resting on the head of a screw 12 (which provides a heat sink for the thermistor) fitted into a cap 13. The thermistor is connected to terminal screws 14 and 15 also fitted into the cap, and leads 16 and 17 for the circuit controlling the solenoid of the valve 10 are attached to these terminals.

The cap 13 is slidable vertically within a cup 18 fixed into part of the fixed frame 19 of the machine, the pyrometer 9, being thereby located under a part of the sealing frame 2 so that one of the heating element wires 4 will engage directly with the thermistor when the frame 2 is lowered. A compression spring 20 acting on the underside of the cap 13 ensures that there is a firm engagement between the wire 4 and the thermistor 11, because the arrangement is such that this spring is compressed slightly each time the frame 2 is lowered. The cap 13 can be lifter out of the cup 18 for replacement.

The control circuit (not shown) includes means for amplifying the signal received from the thermistor to operate the solenoid of the valve 10. Such arrangements are well known to those skilled in the art and need not be described in detail.

Since the temperature achieved by the actual frame 2 (or sealing head) in the vicinity of the element will be related to the temperature of the element, it might prove adequate to measure the temperature of the sealing head instead of attempting to measure the temperature of the wire.

In an alternative arrangement shown in FIG. 3, use is made of the expansion of one of the resistance wires 4 to measure its temperature. A switch operating member 30 is loaded towards a switch 31 by means of a spring 32. The operating member is pivoted at 33 and is connected to one end of one of the resistance wires 4, which, in its cold state, pulls the operating member away from the switch against the action of the spring. As the wire extends due to its heating, it allows the spring to pull the operating member towards the switch, at the preset temperature it operates the switch 31 which controls the solenoid 10 to actuate the piston and cylinder power means 7, 8 and thereby raise the sealing frame 2.

Another sensing device shown in FIG. 4 comprises an electric voltmeter 40 arranged to measure the voltage drop across the resistance wire 4 as its resistance increases due to the rise in temperature. The voltmeter is provided with suitable contacts connected with the solenoid valve 10 to operate the valve to raise the sealing frame 2 when the heating element wire 4 reaches a selected temperature.

Yet another device shown in FIG. 5 employs temperature measuring apparatus responsive to the color of the wire, or the emission of infra red rays from it. An infrared or color detector 50 is placed in close proximity to the resistance wire 4. When the sealing wire heats up, the unit 50 operates at a predetermined infra-red or color emission and this operates a switch (not shown) controlling the solenoid valve 10. Whatever method of sensing the temperature is used however, there must be provision for operating the hydraulic or pneumatic cylinder (or their mechanical equivalents) to withdraw the sealing head at the attainment of the predetermined temperature.

Another embodiment of apparatus for sealing superposed plies of thermoplastic film together, as illustrated somewhat schematically in FIGS. 6 to 8, comprises a pack forming station and a sealing station.

The pack forming station comprises a frame (not shown) which supports a pack plate 51 and a film roll 52. The film 53 is drawn off the roll 52, in a folded condition, the fold 54 being along its rear edge, so that there are two layers or plies of film superposed. One layer 55 passes over and the other layer 56 passes under the pack plate 51. Before a packing operation is started, the leading edges of the two layers of film are pulled off the left hand end of the plate 51 (as seen in FIG. 1) and sealed together to form a transverse seal.

The goods to be wrapped are placed on the plate 51 and pushed under the layer 55 into engagement with the rear folded edge 54 and the leading transverse seal of the film.

From the pack forming station, the pack with its film is moved, for example by hand, onto a sealing table 60 at the sealing station. An L-shaped sealing base 62 extends along the front and across the right hand end of the table 60, the base being carried by a fixed support structure (not shown). A sealing frame 61 comprises arms 63 and 64 which extend laterally with respect to the table 60, and a longitudinal front member 65 joining the arms 63 and 64. The entire sealing frame 61 is pivoted about stationary axles 66, and the arm 64 and front member 65 carry electric resistance wire heat sealing elements 67 and 69 (see FIGS. 7 and 8) stretched along their undersides. The lateral arm 64 projects to the front of the longitudinal arm 65, and so does the resistance wire 67. The two wires are however in close physical proximity at the junction of the arms 63 and 65, so that together they form an L-shaped sealing element. The forward extension of the arm 64 and its wire 67 is necessary to seal across practically the full width of the film 53 as will be described later.

Further more, the two wires 67 and 69 are connected in series electrically, so that current is passed through them simultaneously. In order to slide the pack onto the sealing table 60, the sealing frame 61 must be raised by turning it about its axles 66.

When the pack is positioned below the sealing frame, the latter is lowered, for example by hand, to a position where its wire heating elements 67 and 69 engage with the film of the pack. This seals the front edges of the two layers 55 and 56 together, and seals and severs the trailing edges of the two layers of film behind the goods in the pack. In this way, the pack is completely closed, and at the same time, a seal is formed across the leading edge of the stock of film ready for the next pack. The latter seal is across substantially the full width of the film 53. The sealing frame then rises and the wrapped pack passes through an oven (not shown) where the film is shrunk on to the goods in the pack.

A power operated mechanism, such as the ram-and-cylinder device of the arrangement shown in FIG. 1 is provided for lifting the sealing frame away from the base 62.

The electrical circuit for the series connected heating elements 67 and 69 includes a switch (not shown) which is closed whenever the frame 61 is lowered into its operative, sealing, position, so that current is passed through the elements only so long as the frame is lowered. When the correct temperature for sealing and severing of the film has been achieved, the frame must be lifted, and the machine is therefore provided with a temperature sensing device which signals the achievement of the correct temperature and initiates operation of the power means to lift the frame. Thus although the lowering of the frame is done manually, the lifting is done automatically by power. This is necessary because the time taken the wire element to arrive at the correct temperature varies with operating conditions.

Referring now to FIGS. 7 and 8, it will be observed that one end of the wire 67 is secured to a terminal block 70 by a screw 71 and wing nut 71a. A wire guide 72 of insulating material has a deep recess 73, and is formed with aligned holes 74 through which the wire 76 passes, so that it is stretched across the recess 73.

A mounting block 75 fixed to one side of the arm 64 supports a thermocouple detector device 76, which has a thermo-couple sensing finger 77 extending into the recess 73 and engaging with the top side of the wire 67. A pressure arm 78 is pivoted on a bracket 79 and has a resilient pad 80 which is disposed on the opposite side of the wire 67 from the finger 77 of the thermocouple device. The arm 78 is pulled upwardly by a tension spring 81, so that the arm 78 always presses the wire 67 on to the sensing finger 77 and thereby assures uniform heat conducting engagement.

In this manner it is ensured that the thermocouple 76 always correctly detects the temperature of the sealing element 67 and at the predetermined temperature of the wire, it signals the operation of the power means to lift the sealing frame.

Thus the sealing is discontinued at the attainment of the preselected correct temperature of the sealing element. The operating conditions can vary considerably. Thus the ambient temperature can alter, and the background temperature of the sealing frame, (and therefore the starting temperature of the wire elements) varies according to the frequency of operation of the machine. These variations do not affect the predetermined temperature of operation of the thermocouple, and consequently the sealing always stops at the correct time.

It will be understood that the individual features of the several embodiments herein illustrated and described are interchangeable in so far as they are compatible.

What I claim and desire to secure by Letters Patent is:

1. A method of packaging goods in plastic film which comprises placing said goods between two superposed plies of thermoplastic film, bringing a narrow elongate exposed electrical sealing element into direct engagement with said superposed plies of film along a line on which it is desired to seal said superposed plies together to enclose said goods between said plies, thereupon supplying electric current to said sealing element to heat said sealing element to a temperature above the softening temperature of said thermoplastic film to seal said plies together along said line, sensing the temperature of said sealing element and controlling the engagement of said sealing element with said film and the supply of current to said sealing element by the sensed temperature of said sealing element to automatically immediately remove said sealing element from engagement with said film and discontinue the supply of electric current to said sealing element as soon as the sensed temperature of said sealing element reaches a predetermined value.

2. A method according to claim 1, in which the temperature of said sealing element is sensed by a thermocoupled having a sensing finger resiliently urged into thermal engagement with said sealing element.

3. A method according to claim 1, in which said sealing element changes color with temperature, and in which the temperature of said sealing element is sensed by sensing the color of said sealing element.

4. A method according to claim 1, in which said sealing element is an electrically heated linear metal element which expands when heated, and in which the temperature of said sealing element is sensed by sensing the length of said sealing element.

5. A method according to claim 1, in which said sealing element is an electrical resistance conductor the resistance of which varies with temperature, and in which the temperature of said sealing element is sensed by sensing the voltage drop across the resistance of said conductor.

6. In apparatus for packaging goods between superposed plies of thermoplastic film, means for heat sealing said superposed plies of film together along selected lines to enclose said goods between said plies, comprising means for supporting said superposed plies of film with said goods between them, a sealing head carrying a narrow elongate exposed electrical sealing element, means mounting said sealing head for movement toward and away from said supporting means to move said sealing element into and out of engagement with said film supported on said supporting means, means for moving said sealing head toward said supporting means to bring said sealing element into engagement with said film along a line on which said plies are to be sealed together, means for supplying electric current to said sealing element for heating said sealing element while in engagement with said film, temperature sensing means for sensing the temperature of said sealing element, and power means controlled by said sensing means for immediately discontinuing said current supply and moving said sealing head away from said supporting means and thereby immediately moving said sealing element out of engagement with said film when a predetermined temperature of said sealing element is sensed by said sensing means.

7. Apparatus according to claim 6, in which said temperature sensing means is carried by said sealing head.

8. Apparatus according to claim 6, in which said temperature sensing means is resiliently mounted on said support means in position for thermal engagement with said sealing element when said sealing element is in film-engaging position.

9. Apparatus according to claim 6, in which said temperature sensing means is a thermistor.

10. Apparatus according to claim 6, in which said temperature sensing means comprises a thermocouple carried by said sealing head and having a heat sensing element in thermal engagement with said sealing element.

11. Apparatus according to claim 6, in which said sealing element comprises an electrical resistance wire tensioned between supports of which one is movable, the length of said wire varying with temperature, and in which said temperature sensing means comprises means responsive to the length of said wire between said supports.

12. Apparatus according to claim 6, in which said sealing element comprises an electrical resistance wire the resistance of which varies with temperature, and in which said temperature sensing means comprises means for measuring the voltage drop across said resistance wire.

13. Apparatus according to claim 6, in which said sealing element comprises an electrical resistance wire the color of which varies with temperature, and in which said temperature securing means comprises a photodetector responsive to change in color of said resistance wire.

14. Apparatus according to claim 6, in which said power means comprises a fluid operated piston and cylinder actuator having valve means controlled by said temperature sensing means.

References Cited
UNITED STATES PATENTS

| | | | |
|---|---|---|---|
| 2,532,501 | 12/1950 | Johnson | 219—243 X |
| 3,283,126 | 11/1966 | Velvel | 219—243 X |
| 3,050,916 | 8/1962 | Gausman et al. | 156—583 X |
| 3,239,993 | 3/1966 | Cherrin | 53—390 X |

CLARENCE L. ALBRITTON, Primary Examiner

U.S. Cl. X.R.

53—182; 93—DIG 1; 156—515